United States Patent

[11] 3,607,910

[72] Inventors Louis L. Wood
Potomac, Md.;
Richard A. Hamilton, Houston, Tex.
[21] Appl. No. 833,188
[22] Filed June 13, 1969
[45] Patented Sept. 21, 1971
[73] Assignee W. R. Grace & Co.
New York, N.Y.

[54] PROCESS FOR PRODUCING DIMETHYLIMINODIACETATE
10 Claims, No Drawings
[52] U.S. Cl..................................................... 260/482 R, 260/465.5
[51] Int. Cl..................................................... C07c 101/20
[50] Field of Search......................................... 260/482

[56] References Cited
UNITED STATES PATENTS
2,804,474  9/1957  Lew.............................. 260/534
3,278,478  10/1966  Masterson..................... 260/482 X
OTHER REFERENCES
Noller, C., Chem. of Organic Compounds 2nd. Ed., W. B. Saunders CO. PA').

Primary Examiner—Lewis Gotts
Assistant Examiner—Paul J. Killos
Attorneys—Elton Fisher and Kenneth E. Prince ABSTRACT: "A method for producing dimethyliminodiacetate by reacting methanol with iminodiacetonitrile in the presence of anhydrous hydrogen chloride. Subsequently, adding anhydrous ammonium chloride to adjust the pH to from 6.5 to 8.5 and recover dimethyliminodiacetate."

PROCESS FOR PRODUCING DIMETHYLIMINODIACETATE

BACKGROUND OF THE INVENTION

This invention relates to a new and more efficient method for the direct conversion of iminodiacetonitrile to the free ester, dimethyliminodiacetate. Iminodiacetonitrile is reacted with methanol and anhydrous hydrogen chloride to produce dimethyliminodiacetate hydrochloride. This hydrochloride is removed by the addition of anhydrous ammonia to yield the free ester.

Dimethyliminodiacetate is useful as a component of hot melt adhesives as well as being a starting substance from which other dialkyl iminodiacetates can be formed. By either acid or base catalyzed transesterification (alcoholysis) of dimethyliminodiacetate the higher alkyl esters of iminodiacetate are readily synthesized.

Prior art processes for producing dimethyliminodiacetate include the acid catalyzed reaction of iminodiacetic acid with methanol in aqueous solution, and the reaction of iminodiacetonitrile with methanol and hydrogen chloride followed by treatment with aqueous potassium hydroxide to yield the free ester. (Rec. Trav. Chim., 287 (1908) (Ber. 50 1962 (1917)). In the former process of reacting the iminodiacetic acid with alcohols the reaction is slow and the yields low. In the latter process, the yield as calculated from the amount of iminodiacetonitrile starting material is 33 percent. This low yield occurs even through the yield of the dimethyliminodiacetate hydrochloride after the first part of the reaction is up to 70 percent. The present invention overcomes the problems of deleterious side reactions and yields a pure free ester in about 75 percent yield. This is accomplished by minimizing any hydrolysis of the ester linkages by a close control of the rate of hydrogen chloride addition to the iminodiacetonitrile solution, along with the removal of the hydrochloride from dimethyliminodiacetonitrile hydrochloride by a nonaqueous technique. This hydrochloride removal is carried out by a reaction with anhydrous ammonia which contrary to popular belief does not amidize the ester linkage. These improvements over the prior art process of uncontrolled hydrogen chloride addition, and the removal of hydrochloride using aqueous potassium hydroxide minimizes hydrolysis and increases the yield of dimethyliminodiacetate by over 40 percent.

It is an object of this invention to produce dimethyliminodiacetate in high purity and yield.

It is also an object of this invention to produce dimethyliminodiacetate under substantially anhydrous conditions so as to prevent hydrolysis.

It is further an object of this invention to set out a nonaqueous method of removing hydrogen chloride from dimethyliminodiacetate hydrochloride using anhydrous ammonia.

SUMMARY OF THE INVENTION

Broadly, the present invention encompasses the preparation of dimethyliminodiacetate by the reaction of iminodiacetonitrile with methanol and anhydrous hydrogen chloride to produce dimethyliminodiacetate hydrochloride; with a subsequent treatment with anhydrous ammonia to yield the free ester dimethyliminodiacetate. The process of the present invention yields a pure dimethyliminodiacetate in a high yield. In a more particular view, the present invention concerns a method of quantitatively removing the hydrochloride molecule from dimethyliminodiacetate hydrochloride to yield the free ester in a high yield. This is accomplished by contact with anhydrous ammonia which removes the hydrochloride without causing any hydrolysis or amidization of the ester.

DETAILED DESCRIPTION OF THE INVENTION

The preferred mode of the present invention consists essentially of the reaction:

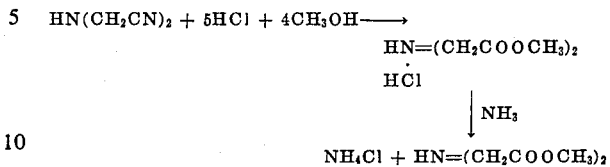

In practice, more than 4 parts methanol are added since this is also the solvent for reaction. Sufficient methanol is used to completely dissolve the iminodiacetonitrile. The preferred methanol is anhydrous methanol in a concentration of about 15 to about 20 mole parts. Anhydrous hydrogen chloride is usually added in slight excess of the stoichiometric 5 mole parts. This is to account for any side reaction with methanol. The preferred concentration is about 6 mole parts.

The iminodiacetonitrile starting material may be in a crude or refined state. Iminodiacetonitrile is readily prepared from the reaction of hexamine with hydrogen cyanide under acid conditions, and has a solubility in methanol at 25° C. of about 7.9 percent by weight.

In conducting the solvolysis reaction of methanol and iminodiacetonitrile, and the reaction of iminodiacetonitrile, anhydrous chloride, and anhydrous methanol, it is preferred that the solution be at reflux (65°–70° C.). This produces the fastest reaction rates without substantially increasing side reactions. Lower temperatures are operable but the rates are slower. On the completion of the solvolysis of the iminodiacetonitrile in methanol anhydrous hydrogen chloride is slowly added while continuing the system at reflux. The preferred rate of addition is 0.33 moles per minute. By the controlled addition of the hydrogen chloride any side reaction with methanol with the resulting production of water is minimized. The presence of water in the system gives an equilibrium

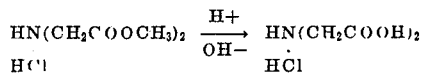

which decreases the purity and yield of the dimethyliminodiacetate hydrochloride slurry product Next the molecule of hydrogen chloride is removed from the dimethyliminodiacetate hydrochloride slurry by the addition of anhydrous ammonia to produce the free ester dimethyliminodiacetate and ammonium chloride The anhydrous ammonia is added in excess to insure complete hydrochloride removal, with about a 25 percent mole excess preferred This produces a pH of from about 6.5 to about 8 During ammonia addition, the temperature of from about room temperature to about 50° C. is preferred After completion of the addition of ammonia the slurry is heated to distill off excess methanol. An aromatic organic solvent such as toluene, xylenes or benzene is added to replace the distilled methanol and to insure complete precipitation of the ammonium chloride side product resulting from the ammonia addition. This ammonium chloride is filtered and washed with the dimethyliminodiacetate remaining in the organic solvent filtrate The added organic solvent is then evaporated from this filtrate and the resulting oil distilled to produce dimethyliminodiacetate in about 75 percent yield and having a refractive index of $N_D^{20}$ 1.4396 and a boiling point of about 87° to about 95° C. at about 2 mm. of mercury The following example is set out to further amplify the present invention

EXAMPLE 1

In a 12-liter three-neck round bottom flask fitted with mechanical stirrer, thermocouple, condenser and gas inlet tube, 950 g. (10 moles) of iminodiacetonitrile is dissolved in 7.5 liters of refluxing methanol (67°–70° C.). Anhydrous hydrogen chloride (2,190 g., 60 moles) is bubbled into the refluxing solution at 0.33 moles per minute (flow meter) for 180 minutes. After 30 minutes a white precipitate forms which disappears over the next 30 to 60 minutes of hydrogen chloride addition. During this time large amounts of methyl chloride evolve and the solution turns a fluorescent yellow-green color. Some dimethyliminodiacetate hydrochloride and ammonium chloride begin to precipitate.

After completing the hydrogen chloride addition the product slurry is refluxed (80° C.) for another 2 to 3 hours. Heating is reduced or discontinued and 30 to 35 g. (1.8–2.0 moles) of anhydrous ammonia is bubbled into the strongly acidic slurry over a period of 10 to 20 minutes to adjust the pH to 6.5–7.0 (moist phydrion paper). An additional 180 g. (10.6 moles) of anhydrous ammonia is added over a period of 10 to 20 minutes to adjust the pH to 7.5–8.0 (moist phydrion paper). At this point, the reaction slurry is brown.

Refluxing is then resumed and all of the unreacted methanol (approximately 7 liters) is then distilled from the reaction slurry. During the distillation a total of 4 liters of toluene is added in several portions to keep the slurry fluid. Distillation of the methanol is complete when the temperature of the vapors reaches that of boiling toluene (110° C.). The product slurry is cooled below 40° C. and the solids removed by filtration with the aid of another 0.5 to 1.0 liters of toluene.

The filter cake is washed with 1.0 liters of toluene to give upon drying, 1,532 g. of tan crystals which are ammonium chloride contaminated with nitrogeneous organic material.

Toluene is removed from the combined filtrates by evaporation in a rotary film evaporator at 60° to 80° C. and 80 mm. The brown product oil (about 1.5 liters) is distilled through a 1 foot long, 1-inch diameter Vigreux column to give the following fractions:

10 g. 25°–87°  2 mm. colorless oil
1,204 g. 87°–95° C.  2 mm. colorless oil $N_D^{20}$ 1.4396, 74.8 percent yield of dimethyliminodiacetate
151 g. black tar pot residue It is claimed:

1. The method of producing dimethyliminodiacetate comprising:
   a. forming a solution of methanol and iminodiacetonitrile;
   b. contacting this solution with anhydrous hydrogen chloride;
   c. adding anhydrous ammonia to adjust the pH to about 6.5 to about 8.5; and
   d. removing residual methanol and recovering dimethyliminodiacetate.

2. The method of claim 1 wherein in forming the solution of methanol and iminodiacetonitrile the mixture is refluxed.

3. The method of claim 1 wherein during the contacting of said solution with anhydrous hydrogen chloride said solution is refluxed.

4. The method of claim 1 wherein during the addition of anhydrous ammonia, the temperature of said solution is maintained between about 0° and about 65° C.

5. The method of claim 1 wherein said residual methanol solvent is removed by distilling.

6. The method of claim 5 wherein during said distilling a fluid selected from the group consisting of toluene, and xylenes and benzene is added.

7. The method of claim 6 wherein said fluid is removed.

8. The method of claim 1 wherein the concentration of methanol is about 190 moles, the concentration of iminodiacetonitrile about 10 moles, the concentration of anhydrous hydrogen chloride about 60 moles, and the concentration of anhydrous ammonia about 12 moles.

9. The method of claim 1 of producing dimethyliminodiacetate comprising:
   a. forming a solution of about 190 moles of methanol and about 10 moles of iminodiacetonitrile by refluxing;
   b. contacting this solution while under reflux with about 60 moles of anhydrous hydrogen chloride;
   c. adding about 12 moles of anhydrous ammonia to adjust the pH to about 6.5 to about 8.5 while maintaining the temperature from about 0° to about 65° C. to produce solid dimethyliminodiacetate;
   d. removing residual methanol by distilling while adding about 40 moles of toluene; and
   e. filtering the solid dimethyliminodiacetate from the added toluene; and
   f. removing residual toluene by evaporation and recovering a dry dimethyliminodiacetate.

10. The method of claim 9 wherein said dimethyliminodiacetate is recovered in about 75 percent yield.